United States Patent [19]

Robinson

[11] Patent Number: 4,518,101
[45] Date of Patent: May 21, 1985

[54] METERING SYSTEM FOR CORROSIVE LIQUIDS AND METHOD THEREFOR

[75] Inventor: Philip R. Robinson, New Kensington, Pa.

[73] Assignee: Allegheny Ludlum Steel Corporation, Pittsburgh, Pa.

[21] Appl. No.: 478,575

[22] Filed: Mar. 24, 1983

[51] Int. Cl.³ .............................................. B67D 5/30
[52] U.S. Cl. .......................................... 222/1; 222/20
[58] Field of Search ............... 222/20, 14, 17, 639, 222/644, 638, 641, 642, 1

[56] References Cited

U.S. PATENT DOCUMENTS

| | | | |
|---|---|---|---|
| 2,967,004 | 1/1961 | Lipshutz et al. | 222/639 |
| 3,777,937 | 12/1973 | Buck | 222/641 |
| 3,946,900 | 3/1976 | Du Brueler, Jr. | 222/20 |
| 4,057,173 | 11/1977 | Tal | 222/638 X |

Primary Examiner—Stanley H. Tollberg
Attorney, Agent, or Firm—Patrick J. Viccaro

[57] ABSTRACT

A metering system is provided for automatically controlling and monitoring corrosive liquids. The system includes a pneumatically or electrically actuated valve and a meter upstream of the valve. The meter includes a device for transmitting an electrical signal proportional to the flow through the meter to a controller means which receives the signal and counts the volume units of flow. The controller also includes a device to transmit an electrical signal to stop the flow of corrosive liquids at a predetermined volume level. The system includes a timer for activating the system at a preset time and a valve actuator means. A method for automatically controlling and monitoring the flow of corrosive liquids is also provided.

9 Claims, 1 Drawing Figure

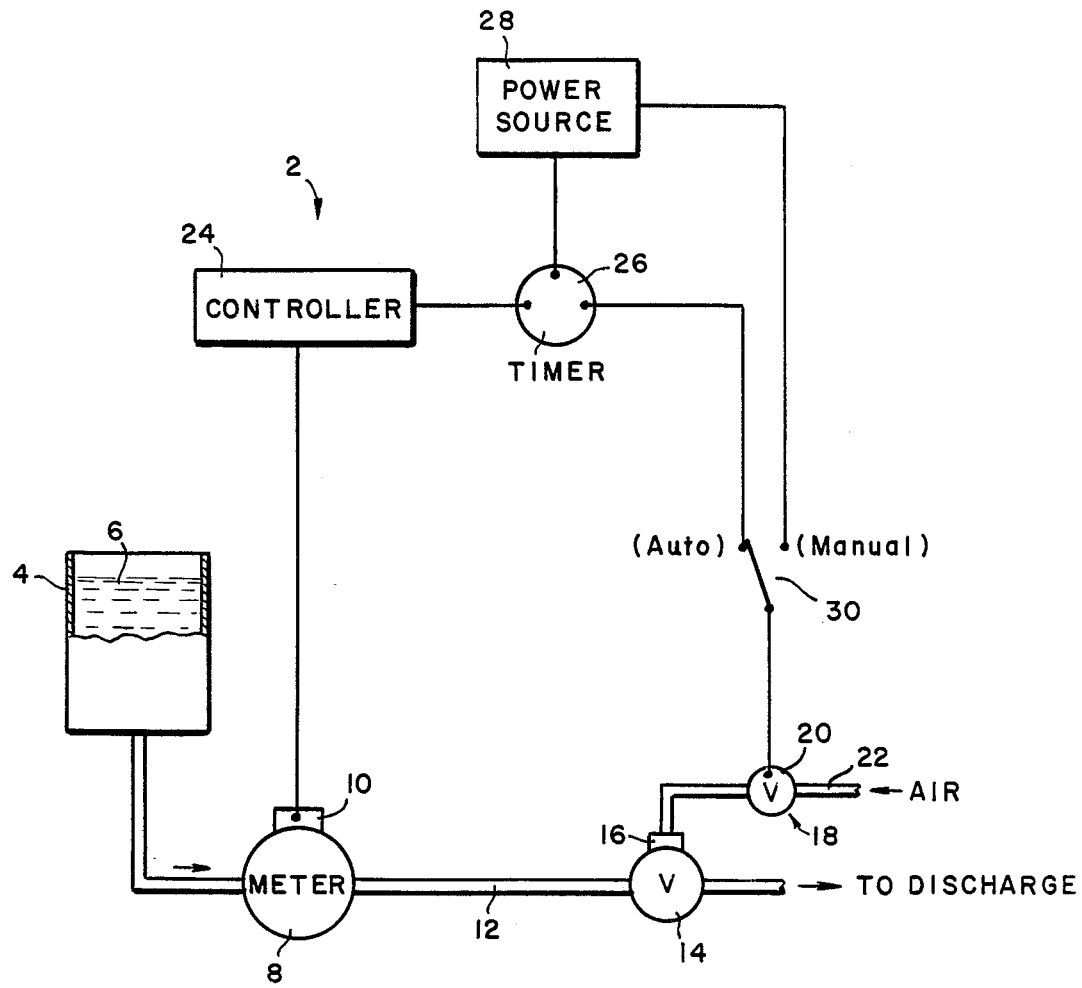
FIGURE

METERING SYSTEM FOR CORROSIVE LIQUIDS AND METHOD THEREFOR

BACKGROUND OF THE INVENTION

This invention relates to a metering system for corrosive liquids. Particularly, this invention relates to an automatic metering system for corrosive liquids useful in metal strip pickling operations.

In the production of metal alloys of various compositions which are fabricated into various forms, including plate, sheet and strip products, it is known to use pickling operations during various stages of the fabrication. The purpose for such pickling operations is to clean any oil, scale and other contaminants from the surface of the metal before further processing or before shipment. Typically, pickling operations include the use of harsh, caustic and corrosive liquids, such as nitric, sulfuric and hydrofluoric acids, halogenated solvents and boiling caustics. Such corrosive liquids are also extremely corrosive to equipment handling such liquids and as a result, special equipment is necessary.

Generally, there are three known ways in the art for metering corrosive liquids, such as hydrofluoric acid, in metal strip pickling operations. One known method includes metering of the corrosive liquids by timing flow from a pipe to the pickling tanks. A second known method includes using an auxiliary tank which is calibrated for small volumes of acid. A third method is by weighing the caustic liquid to be used in the operation. While such methods have been useful for metering corrosive liquids, they are not without problems. Such methods are inadequate, for none of them provide the accuracy required when making frequent additions to a pickling operation, for example. Furthermore, none of these methods provide repeatedly accurate measurements.

What is needed, then, is a metering system for automatically controlling and monitoring corrosive liquids. The system should provide repeatable and accurate measurements, and should be suitable for automatically metering the desired volume of corrosive liquids. The system should also be suitable for incorporation into any automated pickling operation, such as for strip products.

SUMMARY OF THE INVENTION

In accordance with the present invention, a metering system for automatically controlling and monitoring corrosive liquids is provided which includes a conduit means through which the corrosive liquid flows from a reservoir to a discharge location and a valve means in the conduit means for commencing and stopping the flow of corrosive liquids through the conduit. The valve means is corrosion resistant and has an actuator for opening and closing the valve. The system also includes a means for metering the flow of corrosive liquids upstream of the valve means between a reservoir of the corrosive liquids and the valve means. The metering means includes a transmitting device for transmitting an electrical signal which is proportional to the flow through the meter. The system also includes a means for controlling the flow of corrosive liquids and is electrically connected to the metering means and having a receiving device for receiving the electrical signal from the metering means and for counting the volume units of flow through the metering means. The controlling means also has a transmitter for transmitting an electrical signal to stop the flow of the corrosive liquids through the valve at a predetermined volume level. The system further includes a means for activating the system at a preset time and a means for actuating the valve means.

The present invention also includes a method for automatically controlling and monitoring corrosive liquids, including the steps of actuating a valve means for commencing flow through a conduit means at a preset time, flowing corrosive liquids through the conduit means from a reservoir through the valve means to a discharge location, metering the volume units of flow at a metering means at a location upstream of the valve means, transmitting an electrical signal from the metering means which is proportional to the metered flow, receiving at a controlling means an electrical signal and counting the volume units of metered flow and stopping the flow of corrosive liquids at a predetermined volume. The method and apparatus of the present invention is advantageous over the known art in that it provides an accurate and repeatable metering system and a system which is suitable for incorporation into automated pickling operations. Furthermore, the system is relatively uncomplicated and results in reduced costs because of the control in the amount of corrosive liquids used in the pickling operation.

BRIEF DESCRIPTION OF THE DRAWINGS

The FIGURE is a schematic diagram of the metering system of the present invention.

DETAILED DESCRIPTION OF THE PREFERRED EMBODIMENTS

In accordance with the present invention, the FIGURE illustrates a schematic of an embodiment of a metering system 2 of the present invention. Metering system 2 includes a meter 8 and a valve 14 located in conduit or pipe means 12 through which the corrosive liquids flow from a reservoir 4 to a discharge location. The system 2 also includes an actuating means 18 for actuating valve 14. Metering system 2 also includes an electrical circuit including a controller 24, timer 26, power source 28 and switch 30.

Reservoir 4 may be any structure suitable for holding, containing or passing through a corrosive liquid 6 to and through a conduit or pipe means 12. Reservoir 4 and conduit 12 must be made of any suitable corrosion-resistant material resistant to the corrosive liquid with which it will be in contact.

The means for metering the flow of corrosive liquids includes a meter 8 made of suitable corrosion-resistant materials. Meter 8 may have any of various types of metering mechanisms, for that does not form a part of the present invention. Preferably, the meter has a construction which allows straight through flow of the corrosive liquids and is suitable for operation up to pressures of about 300 psig (2109.8K Pascals). The meter may also include a visual dial for indicating the flow rates of corrosive liquids. Meter 8 should also include a transmitting device 10 for transmitting an electrical signal which is proportional to the flow of corrosive liquids through meter 8. Preferably, the electrical signal is a direct current signal and measurable in milliamperes and usually on the order of up to 20 milliamperes. Any suitable electrical or electronic transmitting device will satisfy the requirements, as long as its signal is proportional to the volume flow of corrosive liquids through meter 8.

Meter 8 may be located upstream of valve means and between reservoir 4 and the valve means or downstream valve means. Preferably, meter 8 is located upstream between reservoir 4 and valve 14. With meter 8 located upstream, a more constant pressure drop across the meter is provided than when meter 8 is located downstream. At downstream locations, a differential pressure drop occurs across meter 8 when the valve means is open. A more constant pressure allows meter 8 to maintain accurate measurements and metering over the meter range. Also, locating meter 8 upstream maintains meter 8 full of corrosive liquids at all times, even when valve 14 is closed, and reduces the corrosive effects on meter 8. The meter and other equipment parts tend to be more corrosively attacked when only residual amounts of corrosive liquids remain in contact with meter 8, such as when meter 8 is located downstream of a closed valve 14.

Valve means including valve 14 should be made of corrosion-resistant material and is of a flow control type suitable for commencing and stopping the flow of corrosive liquids through conduit 12. Preferably, the valve is suitable for operating under temperatures up to 200° F. (93.3° C.) and up to pressures of 300 psig (2109.8K Pascals). Valve means must include an actuator 16 for opening and closing the valve for commencing and stopping, respectively, the flow of corrosive liquids through valve 14. The actuator 16 may be of a pneumatic or electric type.

A means for actuating valve 14 is shown as an actuating mechanism 18. The actuating means may be either of the pneumatic or electric type. As shown in the FIGURE, a pneumatic type is described. Actuating means 18 includes a valve 20 in a pipe or conduit 22 for starting or stopping the flow of a fluid, such as air, through conduit 22 to valve actuator 16. Preferably, valve 20 is electrically actuated for controlling the pneumatic actuating means 18.

In the alternative, actuating means 18 may be directly connected electrically to valve actuator 16 for opening and closing valve 14 without the need of any of the pneumatic system including valves 20 and 22.

The means for controlling the flow of corrosive liquids includes a controller 24 having a receiver for receiving the electrical signal from meter 8. Preferably, controller 24 includes an integrator circuit which accepts and receives an electric signal of up to about 20 milliamperes from converters or transmitters. Controller 24 should be able to integrate any electrical signal to produce a proportional count output directly proportional to the volume units of flow through the metering means 8. Controller 24 should also include a predetermining counter and a means capable of transmitting an electrical signal when the counter indicates that a predetermined volume has been metered. Preferably, controller 24 is recycled electrically to permit automatic sampling control as the counter is recycled.

A power source 28 provides the electrical energy necessary for operating the metering system 2. A means for activating the system at a preset time includes a timer 26 electrically connected between the power source 28 and controller 24. Timer 26 is also electrically connected to actuating means 18.

Optionally, an electrical switch 30 may be located in the circuit between timer 26 and actuating means 18, such as to provide the metering system with an automatic or manual control.

In operation of the system of the present invention before the system is electrically activated, reservoir 4 is filled with corrosive liquid 6 which is also present in conduit 12 and meter 8, though stopped from flowing through a closed valve 14. Timer 26 operates on electrical power from power source 28 and at a preset time activates the metering system 2. With switch 30 in the automatic position, timer 26 sends an electrical signal to actuating means 18 for opening valve 20 and pneumatically opening valve 14 through pneumatic actuator 16. Timer 26 also provides electrical power through controller 24 to meter 8 and transmitter 10. As the corrosive liquid flows through meter 8, the meter indicates the flow of the corrosive liquids and transmitting device 10 transmits an electrical signal proportional to the flow to controller 24. Controller 24 receives the electrical signal in a receiving device from the transmitter 10 of meter 8 and counts the volume units of flow through meter 8. When the volume of flow through meter 8 reaches a predetermined volume, controller 24 transmits an electrical signal to actuating means 18 for closing valve 14 through actuator 16. After closing valve 14, controller 24 is electrically recycled, which recycles the entire metering system 2 for the next cycle of discharging corrosive liquids such as to a strip pickling operation.

While several embodiments of the invention have been shown and described, it will be apparent to those skilled in the art that modifications may be made therein without departing from the scope of the present invention.

What is claimed is:

1. A metering system for automatically controlling and monitoring corrosive liquids, the system comprising:
   conduit means through which the corrosive liquid flows from a reservoir to a discharge location;
   valve means in said conduit means for commencing and stopping the flow of corrosive liquids through the conduit means, said valve means being corrosion resistant and having an actuator for opening and closing the valve;
   means for metering the flow of corrosive liquids upstream of the valve means, said metering means being corrosion resistant, being maintained full of the corrosive liquid and having a transmitting device for transmitting an electrical signal proportional to the flow;
   means for controlling the flow of corrosive liquids, said means electrically connected to said metering means and having a receiving device for receiving the electrical signal of said metering means and counting volume units of flow through the metering means, and said means capable of transmitting an electrical signal to stop flow through the valve at a predetermined volume;
   means for activating the system at a preset time, said means electrically connected from a power supply to the controlling means; and
   means for actuating the valve means, said actuating means being electrically connected to the timing means.

2. The system as set forth in claim 1 wherein the actuating means is electrical.

3. The system as set forth in claim 1 wherein the actuating means is pneumatic.

4. The system as set forth in claim 1 wherein the controlling means is electrically recycled for counting.

5. The system as set forth in claim 1 wherein an electrical switch means is provided between the timing means and the valve means.

6. A method for automatically controlling and monitoring corrosive liquids, the method comprising:

actuating a valve means for commencing flow through a conduit means at a preset time;

flowing corrosive liquids through the conduit means from a reservoir through the valve means to a discharge location;

monitoring the volume units of flow at a metering means which is maintained full of the corrosive liquid at a location upstream of the valve means;

transmitting an electrical signal from the metering means proportional to the metered flow;

receiving at a controlling means an electrical signal and counting the volume units of metered flow; and stopping flow of the corrosive liquids at a predetermined volume.

7. The method as set forth in claim 6 wherein the valve means is electrically actuated.

8. The method as set forth in claim 6 wherein the valve means is pneumatically actuated.

9. The method as set forth in claim 6 including the step of electrically recycling the controller means.

* * * * *